UNITED STATES PATENT OFFICE.

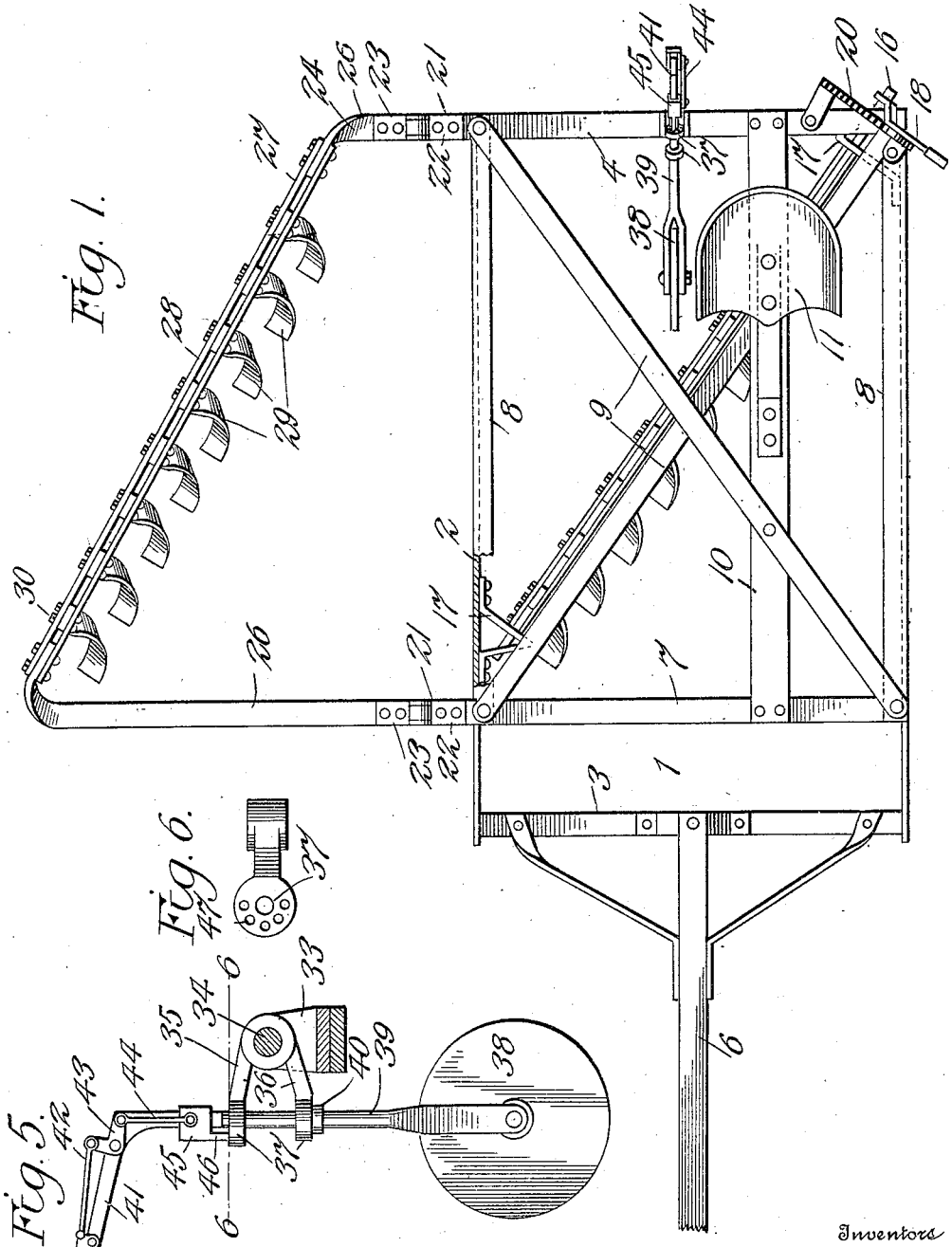

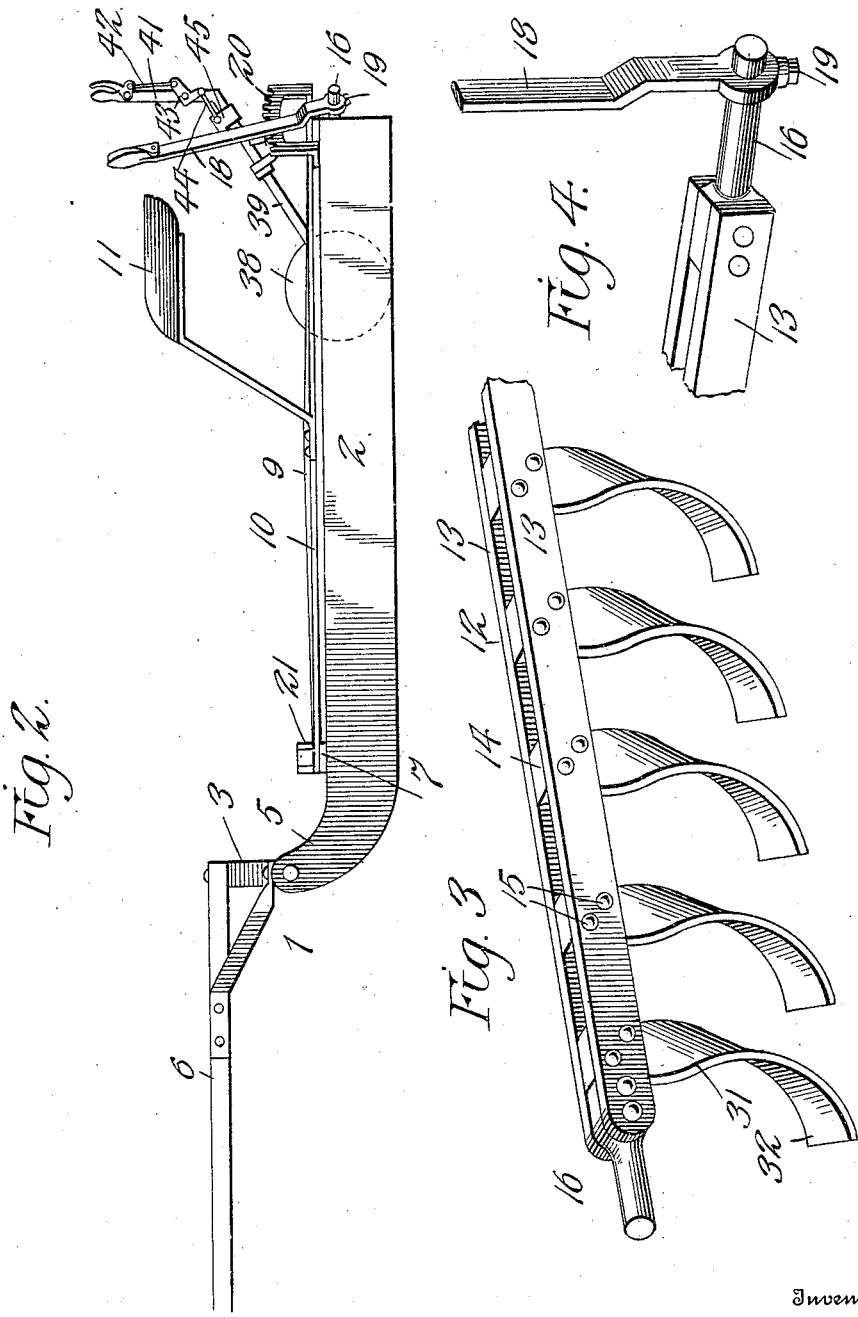

VICTOR McGARVEY POWERS AND CHARLES PRESTON POWERS, OF SATTLEY, CALIFORNIA.

CULTIVATOR.

No. 881,151.          Specification of Letters Patent.          Patented March 10, 1908.

Application filed November 17, 1906. Serial No. 343,866.

*To all whom it may concern:*

Be it known that we, VICTOR McGARVEY POWERS and CHARLES PRESTON POWERS, citizens of the United States, residing at Sattley, in the county of Sierra and State of California, have invented new and useful Improvements in Cultivators, of which the following is a specification.

The invention relates to an improvement in cultivators designed primarily for use in orchard cultivation.

The main object of the present invention is the production of a cultivator having a holding cultivator section, the construction providing for the use of the latter when in operative position for cultivating beneath fruit laden trees, whereby to avoid injury to the tree or fruit.

A further object of the invention is the provision of a novel form of cultivator tooth designed in effect to serve as a combined shear and moldboard in ground cutting.

The invention in its preferred form will be described in the following specification, reference being had particularly to the accompanying drawings, in which:

Figure 1 is a plan of a cultivator constructed in accordance with my invention, the auxiliary section being shown in operative position. Fig. 2 is a side elevation of the same. Fig. 3 is a broken perspective illustrating particularly the construction of the cultivator teeth and their method of attachment. Fig. 4 is a broken perspective illustrating the means by which the cultivator teeth of the main frame are operated. Fig. 5 is a side elevation showing the adjustable ground wheel for the rear end of the cultivator. Fig. 6 is a plan of the casting for supporting the ground wheel from the main frame.

Referring particularly to the drawings, wherein is shown the improved cultivator in the preferred form of details, it will be noted that said implement comprises a main frame 1 including side plates 2 arranged to provide shoes or runners for the implement, the lower edges of the runner being formed in any desired manner. The runners are connected at their relatively forward and rear ends by cross-bars 3 and 4, the former preferably joining the runners at an upwardly turned portion 5 of the latter and serving as a support for a draft-pole 6 of any usual or preferred construction. Immediately in rear of the cross-bar 3, the runners are connected by a second cross-bar 7, said latter bar being preferably in the same plane as the bar 4, and the runners 2 being formed at their upper ends with inwardly extending flanges 8 to provide for a convenient securing of the cross-bars 4 and 6 in place. The main frame is further braced by diagonal bars 9, connected at the respective corners of the frame and to each other by a longitudinal seat-bar 10 extending from the cross-bar 7 to the cross-bar 4 and serving to support the seat 11 for the operator. The main frame 1 is provided with a diagonally arranged tooth frame 12 comprising duplicate bars 13 maintained in spaced parallel relation by the teeth 14 secured between them, said teeth being of a specific construction to be later described. Each tooth is secured between the plates through the medium of two bolts 15, whereby to secure said teeth against independent movement while at the same time providing for their ready disconnection from the frame when desired. The ends of the frame are provided with bearing studs 16, squared at their inner ends and secured between the plates 13, these studs forming the bearing supports for the tooth frame.

Brackets 17 are secured to the relatively inner surfaces and at opposing ends of the runners, the bracket on one runner being immediately adjacent the connection of said runner with the cross-bar 7, while the bracket on the other runner is immediately adjacent the connection of said runner and the cross-bar 4. These brackets, which are in effect bearing plates, are formed with openings for the reception of the respective studs 16 of the tooth frame, whereby said frame is rotatably mounted relative to the main frame, as will be understood.

A lever 18 is connected to the rear stud 16 of the tooth frame, the latter being extended beyond the bracket for this purpose. The lever 18 is adjustably fixed to the stud through the medium of a set-screw 19, and is arranged and constructed for coöperation with the usual notched segment 20, secured to the runner by a cross-bar 4 convenient the lever. By manual operation of the lever 18, the tooth frame may be swung upon the bearing studs 16 to arrange the teeth 14 in cutting position or non-cutting position at the will of the operator. The cross-bars 4 and 7 are extended beyond one of the runners 2 as at 21, and provided with one member 22 of a hinge connection, the other member 23 of which is secured upon the proximate terminals of an auxiliary frame 24, whereby said auxiliary frame is hinged to the main frame.

The auxiliary frame comprises a forward bar 26, a rear bar, and a side bar 27, the latter preferably comprising duplicate plates 28 between which teeth 29, identical in construction with teeth 14 are secured through the medium of duplicate bolts 30, as in the tooth frame carried on the main frame. As the teeth 29 are arranged in longitudinal alinement and it is desirable that their effective operation extend over a considerable width of ground, we provide for such result by arranging the side-bar 27 of the auxiliary frame at an angle relative to the front bar thereof, that is, said side bar 27 is preferably projected in parallel relation to the tooth frame 12, when in position on the main frame. The teeth carried by the main frame and by the auxiliary frame are of identical construction. As clearly shown in Fig. 3, each tooth is constructed of a single length of material, preferably steel, of materially greater width than thickness, and is twisted intermediate its ends, as at 31, to dispose the lower or cutting edge 32 at direct right angles to the plane of movement of the teeth, thus presenting the broad face of the tooth for cutting purposes. By twisting the upper end of the tooth is projected in a plane at right angles to the lower or cutting edge thereof, whereby said tooth may be conveniently secured between the side plates of the supporting frame. The broad cutting face of the teeth provides for an effective action of the latter in operation, while the intermediate twisted portion provides for limiting the cutting depth of the teeth and at the same time directing the earth away from the tooth, similar to the function of the mold-board of the plow. The earth is thus effectively loosened in the operation of the cultivator.

To provide for turning the cultivator when desired, I adjustably secure to the main frame a ground wheel which may, at the will of the operator, be projected to support the frame or be turned out of supporting position. To this end, a bearing plate 33 is secured on the upper side of the rear cross-bar 4, in which is mounted a shaft 34. A supporting casting 35 is rotatably mounted on the shaft 34, including spaced rearwardly extending arms 36 formed at their rear ends with disk heads 37 provided with bearing openings. A ground wheel 38 is supported at the lower end of a wheel shaft 39 arranged to pass through and supported in the bearing openings in the head 37, collars 40 being arranged above and below the respective heads to prevent independent longitudinal movement of the shaft 39. The upper end of the shaft is formed with a handle 41, with which is connected a handle-lever 42 connected through the medium of an angle-lever 43 to a rod 44, the lower end of which engages a block 45 slidably mounted on the shaft 39 above the upper head 37 of the casting, the block being formed with a pin 46 arranged to engage any one of a series of concentrically disposed openings 47 formed in the upper head. Operation of the lever 42 will elevate the block 45 and disengage the pin 46 from the particular opening 47, the reverse movement of the parts causing engagement of the side pin and opening. The ground wheel may thus be secured at any desired angle relative to the casting 35. The pivotal mounting of the casting 35 on the cross-bar 4 permits the operator to rock the ground wheel above the lower plane of the runners 2, when desired to support the main frame upon said runners. To reverse swing the casting across the ground wheel 38 into bearing contact with the ground and elevate the runners thereabove when it is desired to turn the implement.

In ordinary cultivation of orchards or the like, the tooth frame 12 will be utilized as a cutting medium and the implement driven directly beneath the trees. When, however, the trees become heavily laden with fruit and, therefore, hang close to the ground, it is practically impossible to operate the main frame beneath the branches without injuring the trees and fruit. Under these conditions, the auxiliary frame 24, which in the ordinary operation of the cultivator rests upon the main frame, is turned outward upon its hinged connection until the teeth 29 engage the surface of the soil. The auxiliary frame is thus projected laterally of the main frame, and will effectively cultivate the ground beneath the trees without the necessity of the draft animal or driver traveling beneath the trees. It will, of course, be understood that the angular arrangement of the side bar 27 of the auxiliary frame, the length of said bar, and the number of teeth employed are to be controlled by the desire of the user and maker, as it may prove desirable in some instances to so arrange the teeth 29 as to cover a comparatively wide space of ground. Under these conditions, of course, the teeth 29 will be in greater number and the bar 27 will be disposed at a greater angle to the line of draft of the implement than is shown in the drawing.

The various structural parts of the implement are preferably of steel or other substantial metal, thereby providing the necessary rigidity without materially increasing the weight of the implement.

When the tooth frame 12 is not desired for use in cultivation, as for instance, when the auxiliary frame is in use, the lever 18 may be operated to swing said tooth frame upon the stud 16 and elevate the teeth 14 above the surface of the ground. For convenience, the lever 18 and the handle end 41 of the ground wheel shaft are mounted on the main frame in a position convenient to the seat of the operator, thereby permitting the operation of these parts without necessitating the driver elevating his seat.

Having thus described the invention, what we claim is:—

1. A cultivator comprising a main frame including runners, a bracket projecting from the forward end of one runner, a second bracket projecting from the rear end of the opposite runner, a frame pivotally mounted in the brackets, means for rotating the frame, and a series of cultivating teeth depending from the pivoted frame.

2. A cultivator comprising a main frame including runners, a bracket projecting from the forward end of one runner, a second bracket projecting from the rear end of the opposite runner, a frame pivotally mounted in the brackets, means for rotating the frame, and a series of cultivating teeth depending from the pivoted frame, each of said teeth comprising a length of material twisted intermediate its ends to dispose the lower or cutting edge at approximate right angles to the plane of movement of the teeth.

3. A cultivator comprising a main frame including runners, a bracket projecting from the forward end of one runner, a second bracket projecting from the rear end of the opposite runner, a frame pivotally mounted in the brackets, means for rotating the frame, a series of cultivating teeth depending from the pivoted frame, cross bars uniting the runners and projected beyond the same, and an auxiliary frame hinged to the projecting ends of the cross bars.

4. A cultivator comprising a main frame including runners, a bracket projecting from the forward end of one runner, a second bracket projecting from the rear end of the opposite runner, a frame pivotally mounted in the brackets, means for rotating the frame, a series of cultivating teeth depending from the pivoted frame, cross bars uniting the runners and projected beyond the same, an auxiliary frame hinged to the projecting ends of the cross bars, the outer or free edge of said auxiliary frame being inclined with respect to both runners of the main frame, and a series of teeth depending from said inclined edge.

5. A cultivator comprising a main frame including runners, a bracket projecting from the forward end of one runner, a second bracket projecting from the rear end of the opposite runner, a frame pivotally mounted in the brackets, means for rotating the frame, a series of cultivating teeth depending from the pivoted frame, cross bars uniting the runners and projected beyond the same, an auxiliary frame hinged to the projecting ends of the cross bars, the outer or free edge of said auxiliary frame being inclined with respect to both runners of the main frame, and a series of teeth depending from said inclined edge, the pivoted frame within the main frame being inclined in parallel relation to the inclined edge of the auxiliary frame.

6. A cultivator comprising a main frame including spaced parallel runners, a draft pole connected to the forward ends of said runners, cross bars connecting the runners transverse the frame in rear of the draft pole, said cross bars extending beyond one runner, an auxiliary frame having hinged connection with the extended ends of the cross bars, the outer edge of said frame being inclined with respect to the runners of the main frame, and a series of teeth carried by said inclined edge.

7. A cultivator comprising a main frame of approximately rectangular outline, a draft pole connected to said frame, an auxiliary frame having hinged connection with the main frame, the outer edge of said auxiliary frame including spaced parallel bars and being inclined with respect to the side bars of the main frame, and a series of teeth secured between the spaced parallel bars of the auxiliary frame.

In testimony whereof, we affix our signatures in presence of two witnesses.

VICTOR McGARVEY POWERS.
CHARLES PRESTON POWERS.

Witnesses:
G. L. COATES,
LAWSON CUTTER HOBART.